United States Patent [19]

Shiojiri et al.

[11] Patent Number: 5,550,589
[45] Date of Patent: Aug. 27, 1996

[54] METHOD OF ADAPTIVELY MULTIPLEXING A PLURALITY OF VIDEO CHANNEL DATA USING CHANNEL DATA ASSIGNMENT INFORMATION OBTAINED FROM A LOOK-UP TABLE

[75] Inventors: Hirohisa Shiojiri; Toshio Koga, both of Tokyo, Japan

[73] Assignee: NEC Corporation, Tokyo, Japan

[21] Appl. No.: 334,441

[22] Filed: Nov. 4, 1994

Related U.S. Application Data

[63] Continuation of Ser. No. 940,406, Sep. 3, 1992, abandoned.

[30]     Foreign Application Priority Data

Sep. 3, 1991   [JP]   Japan ..................................... 3-221934

[51] Int. Cl.[6] .................................................... H04N 7/08
[52] U.S. Cl. .......................... 348/387; 348/385; 348/419; 348/423
[58] Field of Search ..................... 370/95.1, 79; 348/387, 348/385, 471, 472, 419, 423, 390; 358/141, 142, 146, 133, 136; H04N 7/13, 7/133, 7/137, 7/08

[56]                References Cited

U.S. PATENT DOCUMENTS 4,215,564   7/1980   Iijima ........................................ 348/387

OTHER PUBLICATIONS

Kaneko et al., "Digital Transmission of Broadcast Television with Reduced Bit Rate" NTC '77 Conference Record Los Angeles, CA., USA pp. 41:4–1 to 41:4–6 Dec. 1977.
T. Koga et al, "Statistical Performance Analysis . . . for Broadcase Television Signals", IEEE Transactions on Communications, vol. COM–29, No. 12, Dec. 1981, pp. 1868–1876.

*Primary Examiner*—David E. Harvey
*Attorney, Agent, or Firm*—Sughrue, Mion, Zinn, Macpeak & Seas

[57]                      ABSTRACT

A method of adaptively multiplexing a plurality of video channel data is disclosed. A multiplexed data includes a plurality of frames each of which contains a plurality of sub-frames. The video channel data are adaptively allocated to the sub-frames. A memory occupancy value of a buffer, which is provided in each of a plurality of video channels, is determined. The buffer is arranged to receive the corresponding video information. A plurality of control signals are produced each of which indicates the memory occupancy value of the corresponding buffer. Following this, a look-up table is accessed which includes a plurality of video channel assignment data for assigning the video channel data to The sub-frames. Thus, one of the channel data assignment data is derived from the look-up table. The video channel data are then multiplexed using one of said channel data assignment data derived from the look-up table.

10 Claims, 9 Drawing Sheets

| ROW NO. OF LUT | INPUT TO LUT | | | | OUTPUT FROM LOOK-UP TABLE (SUB-FRAME NO.) | | | | | | | | | | | | | | | |
|---|---|---|---|---|---|---|---|---|---|---|---|---|---|---|---|---|---|---|---|---|
| | B1 | B2 | B3 | B4 | 1 | 2 | 3 | 4 | 5 | 6 | 7 | 8 | 9 | 10 | 11 | 12 | 13 | 14 | 15 | 16 |
| 0001 | 0 | 0 | 0 | 0 | D1 | D2 | D3 | D4 | D1 | D1 | D1 | D1/D2 | D2 | D2 | D2/D3 | D3 | D3 | D3/D4 | D4 | D4 |
| 0002 | 0 | 0 | 0 | 1 | D1 | D2 | D3 | D4 | D1 | D1 | D1/D2 | D2 | D2 | D2/D3 | D3 | D3 | D3/D4 | D4 | D4 | D4 |
| 0003 | 0 | 0 | 0 | 2 | D1 | D2 | D3 | D4 | D1 | D1/D2 | D2 | D2 | D2/D3 | D3 | D3 | D3/D4 | D4 | D4 | D4 | D4 |
| 0004 | 0 | 0 | 0 | 3 | D1 | D2 | D3 | D4 | D1 | D1/D2 | D2 | D2/D3 | D3 | D3 | D3/D4 | D4 | D4 | D4 | D4 | D4 |
| 0005 | 0 | 0 | 0 | 4 | D1 | D2 | D3 | D4 | D1/D2 | D2 | D2 | D2/D3 | D3 | D3/D4 | D4 | D4 | D4 | D4 | D4 | D4 |
| 0006 | 0 | 0 | 0 | 5 | D1 | D2 | D3 | D4 | D1/D2 | D2 | D2/D3 | D3 | D3/D4 | D4 | D4 | D4 | D4 | D4 | D4 | D4 |
| 0007 | 0 | 0 | 0 | 6 | D1 | D2 | D3 | D4 | D1/D2 | D2/D3 | D3 | D3/D4 | D4 | D4 | D4 | D4 | D4 | D4 | D4 | D4 |
| 0008 | 0 | 0 | 0 | 7 | D1 | D2 | D3 | D4 | D2 | D2/D3 | D3 | D3/D4 | D4 | D4 | D4 | D4 | D4 | D4 | D4 | D4 |
| 0009 | 0 | 0 | 1 | 0 | D1 | D2 | D3 | D4 | D1 | D1 | D1 | D1/D2 | D2 | D2 | D2/D3 | D3 | D3 | D3/D4 | D4 | D4 |
| 0010 | 0 | 0 | 1 | 1 | D1 | D2 | D3 | D4 | D1 | D1 | D1/D2 | D2 | D2 | D2/D3 | D3 | D3 | D3/D4 | D4 | D4 | D4 |
| 0011 | 0 | 0 | 1 | 2 | D1 | D2 | D3 | D4 | D1 | D1/D2 | D2 | D2 | D2/D3 | D3 | D3 | D3/D4 | D4 | D4 | D4 | D4 |
| 0012 | 0 | 0 | 1 | 3 | D1 | D2 | D3 | D4 | D1 | D1/D2 | D2 | D2/D3 | D3 | D3 | D3/D4 | D4 | D4 | D4 | D4 | D4 |
| 0013 | 0 | 0 | 1 | 4 | D1 | D2 | D3 | D4 | D1/D2 | D2 | D2 | D2/D3 | D3 | D3/D4 | D4 | D4 | D4 | D4 | D4 | D4 |
| 0014 | 0 | 0 | 1 | 5 | D1 | D2 | D3 | D4 | D1/D2 | D2 | D2/D3 | D3 | D3/D4 | D4 | D4 | D4 | D4 | D4 | D4 | D4 |
| 0015 | 0 | 0 | 1 | 6 | D1 | D2 | D3 | D4 | D1/D2 | D2/D3 | D3 | D3/D4 | D4 | D4 | D4 | D4 | D4 | D4 | D4 | D4 |
| 0016 | 0 | 0 | 1 | 7 | D1 | D2 | D3 | D4 | D1/D3 | D2/D3 | D3 | D3/D4 | D4 | D4 | D4 | D4 | D4 | D4 | D4 | D4 |
| 0187 | 0 | 2 | 7 | 3 | D1 | D2 | D3 | D4 | D2 | D2/D3 | D3 | D3 | D3 | D3 | D3 | D3 | D3 | D3 | D4 | D4 |
| 4089 | 7 | 7 | 7 | 0 | D1 | D2 | D3 | D4 | D1 | D1 | D1 | D1/D2 | D2 | D2 | D2/D3 | D3 | D3 | D3/D4 | D4 | D4 |
| 4090 | 7 | 7 | 7 | 1 | D1 | D2 | D3 | D4 | D1 | D1 | D1/D2 | D2 | D2 | D2/D3 | D3 | D3 | D3/D4 | D4 | D4 | D4 |
| 4091 | 7 | 7 | 7 | 2 | D1 | D2 | D3 | D4 | D1 | D1/D2 | D2 | D2 | D2/D3 | D3 | D3 | D3/D4 | D4 | D4 | D4 | D4 |
| 4092 | 7 | 7 | 7 | 3 | D1 | D2 | D3 | D4 | D1 | D1/D2 | D2 | D2/D3 | D3 | D3 | D3/D4 | D4 | D4 | D4 | D4 | D4 |
| 4093 | 7 | 7 | 7 | 4 | D1 | D2 | D3 | D4 | D1/D2 | D2 | D2 | D2/D3 | D3 | D3/D4 | D4 | D4 | D4 | D4 | D4 | D4 |
| 4094 | 7 | 7 | 7 | 5 | D1 | D2 | D3 | D4 | D1/D2 | D2 | D2/D3 | D3 | D3/D4 | D4 | D4 | D4 | D4 | D4 | D4 | D4 |
| 4095 | 7 | 7 | 7 | 6 | D1 | D2 | D3 | D4 | D1/D2 | D2/D3 | D3 | D3/D4 | D4 | D4 | D4 | D4 | D4 | D4 | D4 | D4 |
| 4096 | 7 | 7 | 7 | 7 | D1 | D2 | D3 | D4 | D1 | D1/D2 | D2 | D2 | D2/D3 | D3 | D3 | D3/D4 | D4 | D4 | D4 | D4 |

FIG. 7

METHOD OF ADAPTIVELY MULTIPLEXING A PLURALITY OF VIDEO CHANNEL DATA USING CHANNEL DATA ASSIGNMENT INFORMATION OBTAINED FROM A LOOK-UP TABLE

This is a continuation of application Ser. No. 07/940,406 filed Sep. 3, 1992, now abandoned.

BACKGROUND OF THE INVENTION

1. Field of the Invention

The present invention relates to a method and arrangement of adaptively multiplexing a plurality of video signals after being digitally encoded, and more specifically to such a method and arrangement wherein a transmission bit rate of each video signal is effectively determined using a look-up table.

2. Description of the Prior Art

It is known in the art to adaptively multiplex a plurality of video signals after digital encoding and then transmit the multiplexed signals over a transmission path (channel). One of such techniques has been disclosed in a paper entitled "Statistical Performance Analysis of an Interframe Encoder for Broadcast Television Signals" by Toshio KOGA, et el., IEEE Transactions on Communications, Vol. COM-29, No. 12, December 1981, pages 1868–1876.

Figure 1:
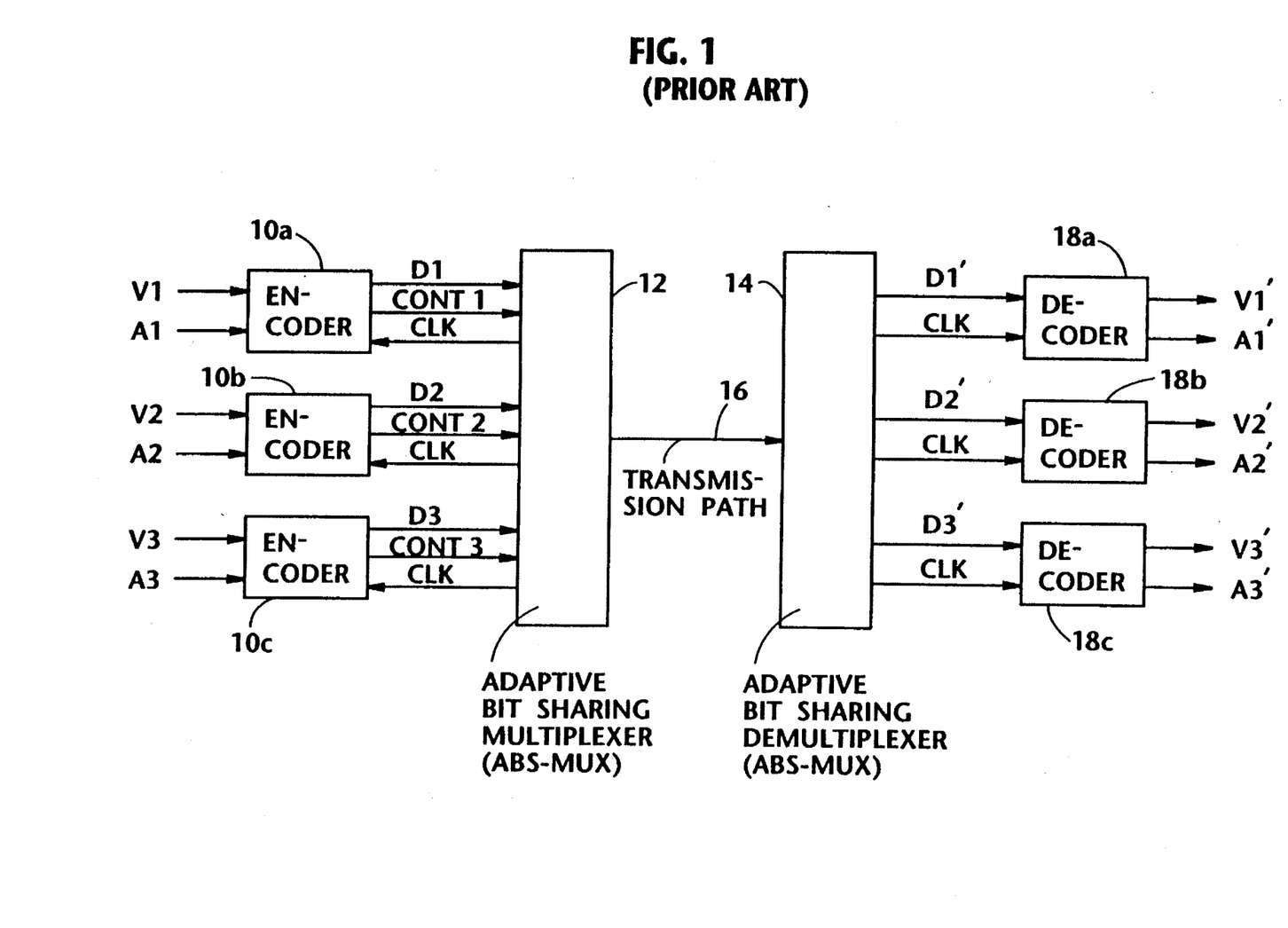
FIG. 1 is a block diagram showing the prior art arrangement discussed in the opening paragraphs of the instant disclosure.

Before turning to the present invention it is deemed preferable to briefly discuss the known technique with reference to FIG. 1 which corresponds to FIG. 9 given in the prior art on page 1873.

Three channels of video and audio signals, denoted by V1-A1, V2-A2 and V3-A3, are respectively applied to encoders 10a–10c which in turn apply control signals CONT1–CONT3 to an adaptive bit sharing multiplexer (ABS-MUX) 12. Each of the Control signals CONT1–CONT3 indicates a memory occupancy value of a buffer (not shown) provided in the corresponding encoder (10a, 10b or 10c). The multiplexer 12 determines bit rates to be assigned to the encoders 10a–10c with the total bit rate kept constant at 60 Mbits/s. The average bit rate per channel is 20 Mbit/s in the three-channel arrangement as shown.

The bit rate assignment determination is performed every 153.6 μs (viz., one adaptive bit sharing (ABS) frame time). The ABS frame (hereinlater may be referred to as a frame) is composed of 18 sub-frames each of which includes 512 bits. The bit rate assignment is implemented by changing the number of sub-frames assigned to each channel in one frame. For example, in the case of the three-channel multiplexing, the number of sub-frames assigned to each channel is selected from 5, 6, 7 and 8 with the total number of the sub-frames allocated to the three channels being kept constant at 18. Since one frame has 18 sub-frames in this particular case, the bit rates to be assigned to the three incoming signal channels are combinations selected among 16.7 Mbite/s, 20.0 Mbits/s, 23.3 Mbits/s and 26.7 Mbits/s, which respectively correspond to 5, 6, 7 and 8 sub-frames.

An adaptive bit sharing demultiplexer 14 is arranged to receive a multiplexed data Dm transmitted over a transmission path 16, generates three data D1'–D3' which are replicas of the original data D1–D3, and extract clocks CLKS from the received data. The reproduced data D1'–D3' are respectively applied to decoders 18a–18c together with the clocks. The decoders 18a–18c produce three pairs of video and audio signals V1'–A1', V2'–A2' and V3'–A3' corresponding to the original signals applied to the decoders 10a–10c.

By adaptively selecting three of the four predetermined bit rates and assigning them to the three channels every frame, the prior art is advantageous in simplifying the bit rate assignment operations. Thus, the overall operation time at the transmitter can effectively be reduced.

However, this prior art has encountered the problems set forth below in that the number of bit rates available is restricted to four.

For the sake of description it is assumed that: (a) each of the two video signals V1 and V2 provides picture information including rapid motions of images and/or subject to frequent switching of picture scenes (for example) and thus (b) each of the signals V1, V2 is preferable to be transmitted at the maximum bit rate (viz., 26.7 Mbits/s) for exhibiting reasonable reproduced picture quality. In this instance, the total of the two bit rates assigned to V1 and V2 is 53.4 (=26.7×2) Mbits/s. This means that the remaining bit rate is 6.6 Mbits/s. Therefore, even if the third video signal V3 provides still pictures and hence can be transmitted without degrading signal quality at less than 6.6 (=60.0–53.4) Mbits/s, the video signal V3 has to be transmitted at 16.7 Mbits/s (viz., the minimum bit rate). Accordingly, one of the video signals V1, V2 is undesirably transmitted at 23.3 Mbits/s while the other is transmitted at 20 Mbits/s. Thus, each of V1 and V2 is transmitted at the bit rate lower than that preferable. Accordingly, the reproduced signals of V1 and V2 are inevitably degraded in terms of signal quality.

SUMMARY OF THE INVENTION

It is an object of the present invention to provide a method wherein a large number of combinations of bit rates are rapidly obtained using a look-up table to which a plurality of control signals indicative of buffer occupancy values are applied.

It is an object of the present invention to provide a hardware arrangement wherein a large number of combinations of bit rates are rapidly obtained using a look-up table to which a plurality of control signals indicative of buffer occupancy values are applied.

More specifically an aspect of the present invention comes in a method of adaptively multiplexing a plurality of video channel data, a multiplexed data including a plurality of frames each of which contains a plurality of sub-frames to which the plurality of video channel data are adaptively allocated, comprising the steps of: (a) determining a memory occupancy value of a buffer which is provided in each of a plurality of video channels and to which the corresponding video information is applied; (b) generating a plurality of control signals each of which indicates the memory occupancy value of the corresponding buffer; (c) accessing a lock-up table which includes a plurality of video channel assignment data for assigning the plurality of video channel data to the plurality of sub-frames, and deriving one of the channel data assignment data; and (d) multiplexing the plurality of video channel data using the one of the channel data assignment data.

BRIEF DESCRIPTION OF THE DRAWINGS

The features and advantages of the present invention will become more clearly appreciated from the following description taken in conjunction with the accompanying drawings in which like elements ere denoted by like reference numerals and in which:

FIG. 6 shows an example of a look-up table which is used in connection with the present invention;

DETAILED DESCRIPTION OF THE PREFERRED EMBODIMENTS

Figure 2:
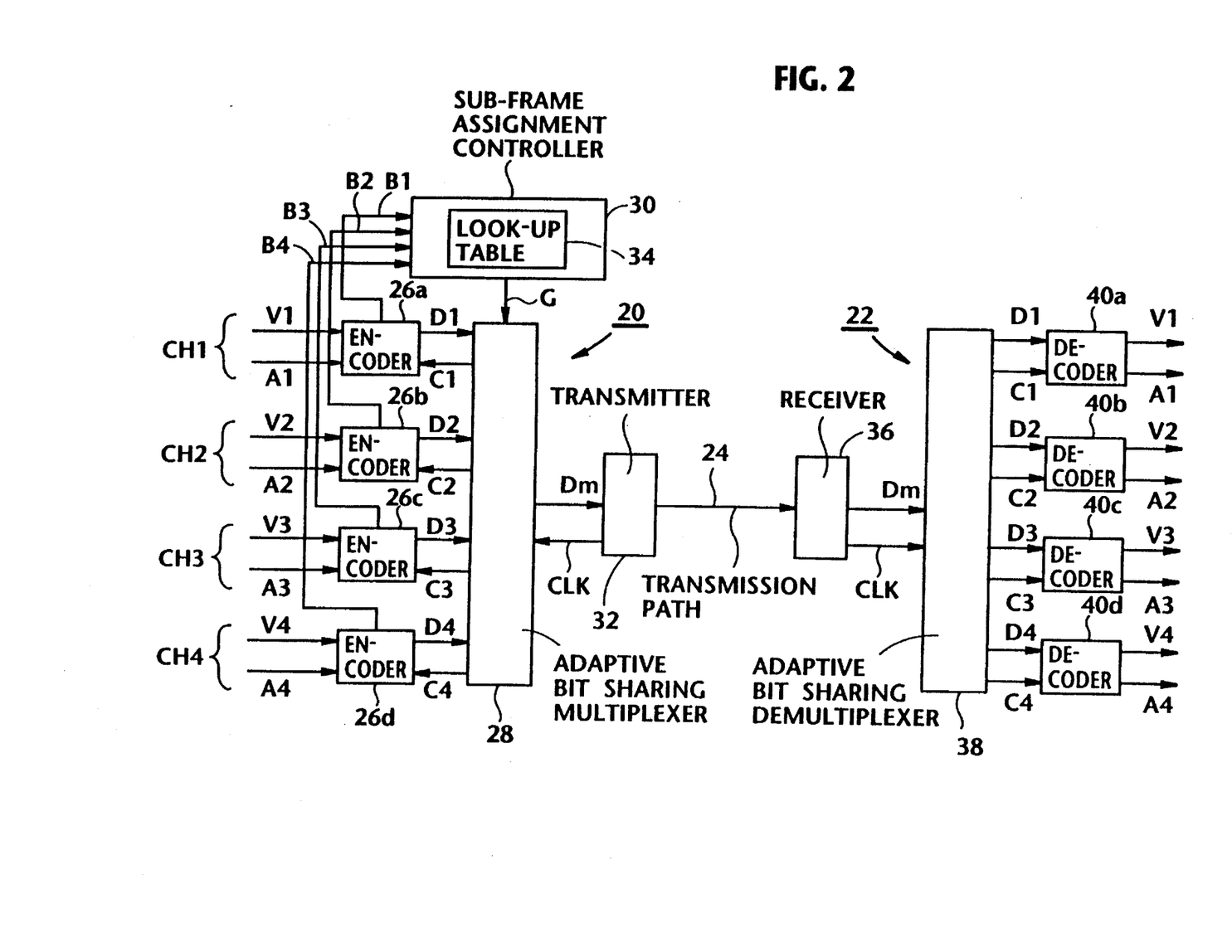
FIG. 2 is a block diagram showing the hardware arrangement to which the present invention is applicable.

Reference is now made to FIG. 2, wherein there is shown a hardware arrangement to which the present invention is applicable.

As illustrated, the arrangement of FIG. 2 generally includes two main sections 20 and 22, which are interconnected via a transmission path 24, for transmitting and receiving multiplexed video signals including audio information.

The transmission section 20 is provided with, in this particular embodiment, four encoders 26a–26d, an adaptive bit sharing multiplexer 28, a sub-frame assignment controller (viz., a channel bit rate controller) 30 and a transmitter 32. The controller 30 includes a look-up table 34. On the other hand, the receiver section 22 is provided with a receiver 36, an adaptive bit sharing demodulator 38 and four decoders 40a–40d.

The present invention is particularly concerned with the provision of the sub-frame assignment controller 30 for effectively increasing freedom or flexibility of assigning sub-frames to four channels CH1–CH4.

The encoders 26a-26d are supplied with four pairs of video/audio signals V1-A1, V2-A2, V3-A3 and V4-A4 via the channels CH1–CH4, respectively.

Figure 3:
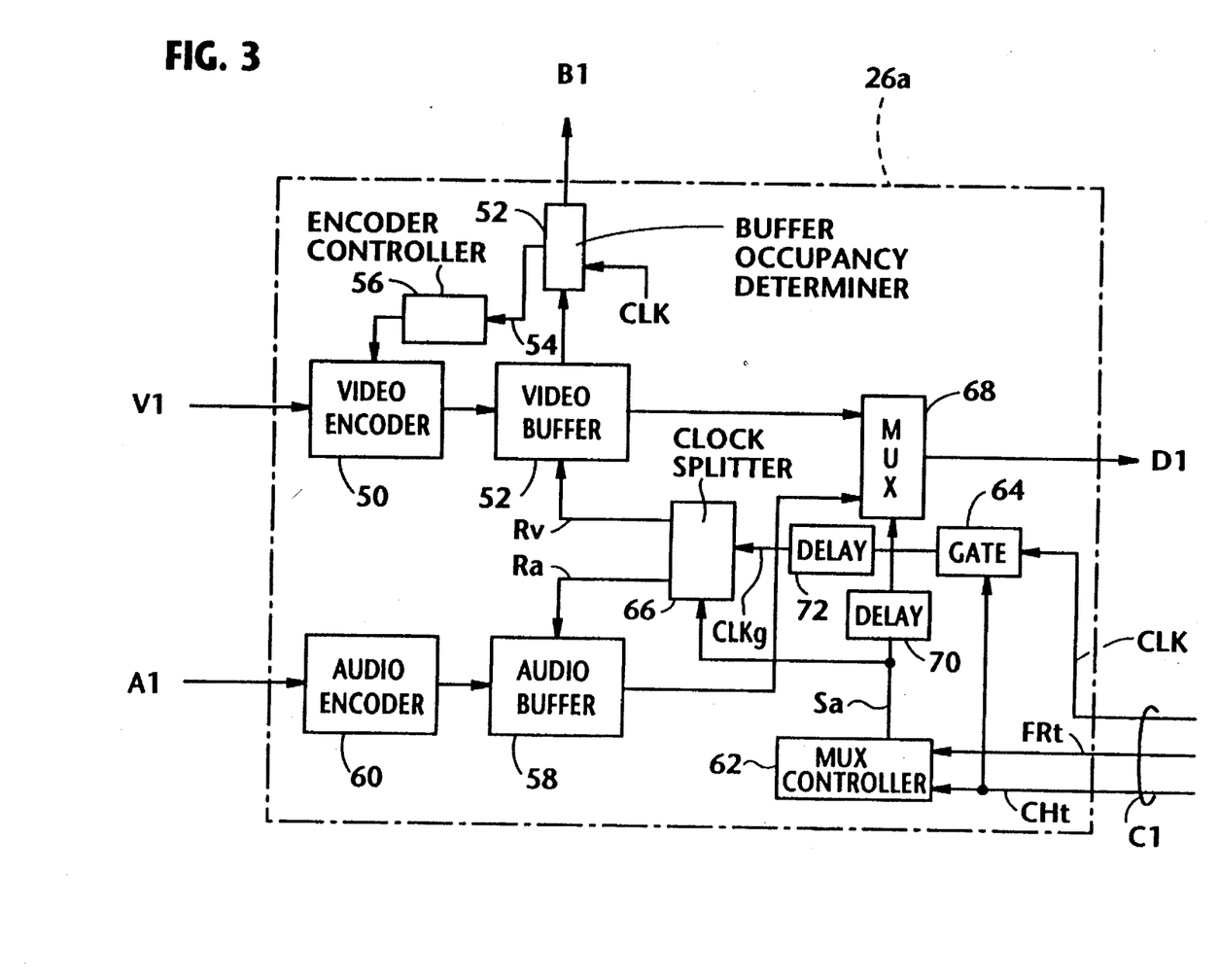
FIG. 3 is a block diagram showing one of the encoders depicted in FIG. 2.

FIG. 3 shows in block diagram form the encoder 26a. The other encoders 26b–26d are respectively configured in the same manner as shown in FIG. 3.

In FIG. 3, the incoming video signal V1 is applied to a video encoder 50 and subject to interframe encoding thereat. The encoded data, which takes the form of variable length encoded sequences, are applied to a video buffer 51. A buffer occupancy determiner 52 is provided to determine the amount of video information stored in the buffer 52. As an alternative, the determiner 52 can be arranged to detect an increasing rate of information stored in the buffer per one frame duration. An encoder controller 56 receives a buffer occupancy value signal 54 from the determiner 52 and controls an encoding parameter (e.g., quantizing step) depending on the signal 54 in a manner which confines an average video information encoded within a predetermined range. The buffer occupancy determiner 52 also outputs a control signal B1 which indicates the buffer occupancy of the encoded video information at the buffer 51. The control signal B1 issues at a predetermined time interval which will be referred to later.

The audio signal A1 is stored in an audio buffer 58 after being encoded by an audio encoder 60. An encoding parameter of the encoder 60 is kept constant and hence the encoded audio information is stored at a fixed rate into the buffer 58.

Figure 4:
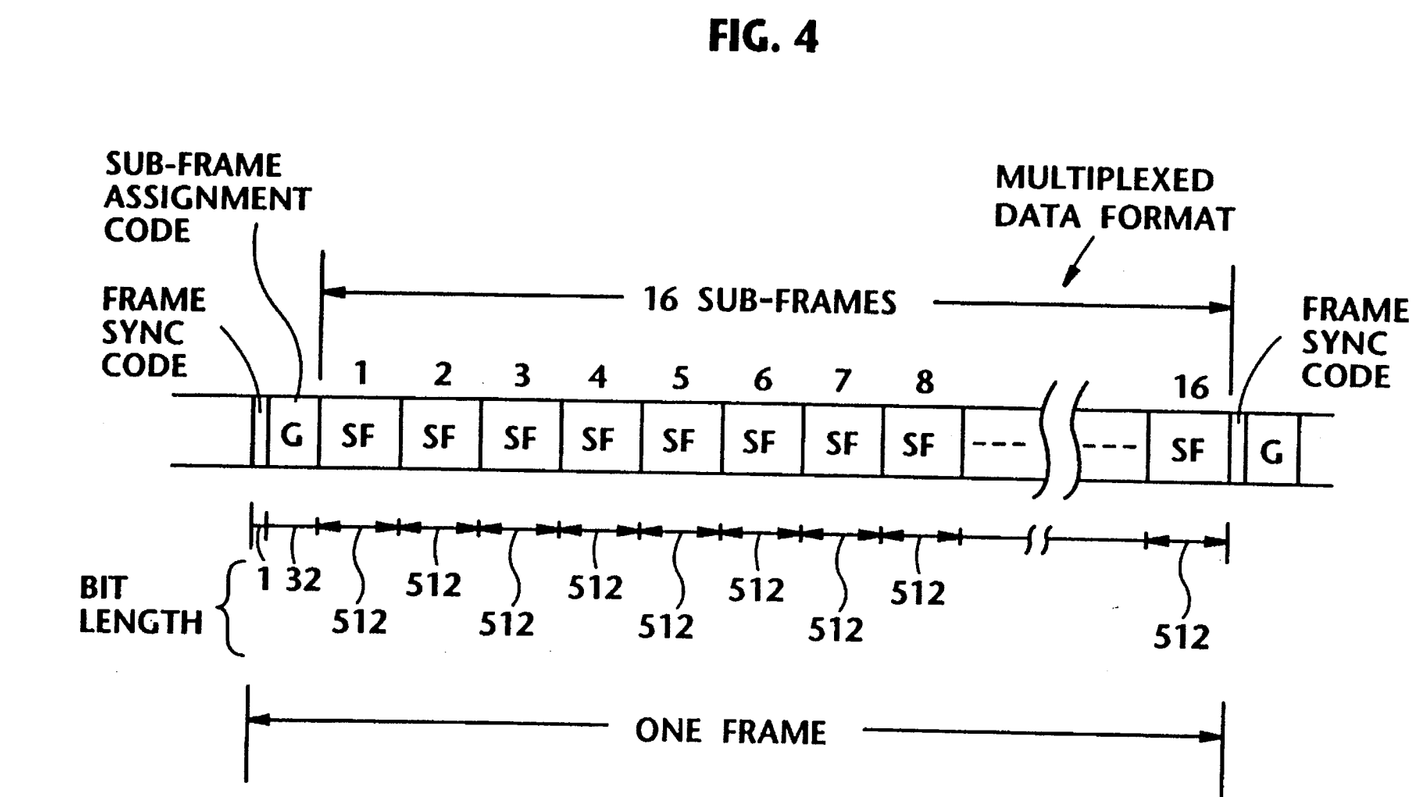
FIGS. 4 and 5 are figures which depict a frame format of multiplexed data and the manner in which it is organized in accordance with the present invention.

Before further discussing the arrangement of FIG. 3, multiplexed data Dm generated by the adaptive multiplexer 28 will be discussed with reference to FIG. 4. As shown in FIG. 4, one frame of the multiplexed data Dm starts with a 1-bit frame sync code which is followed by a 32-bit sub-frame assignment code G. Next come 16 sub-frames (SF) each of which has bit length of 512. Since it has been assumed that the number of video channels is 4 (viz., CH1–CH4) which can be denoted by 2-bits, the code G is provided with 32 bits.

Figure 5:
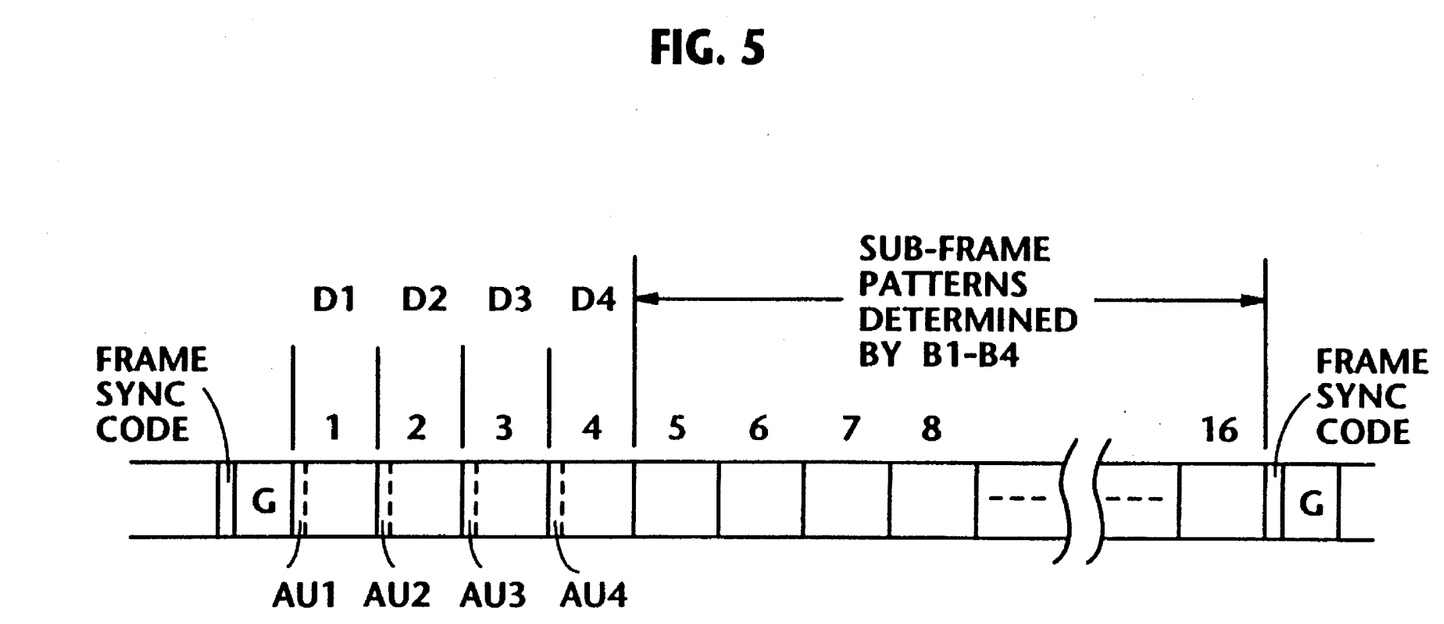

A frame of the multiplexed data Dm will further be discussed with reference to FIG. 5. The instant embodiment is arranged to include all the video data D1–D4 in the first four sub-frames 1–4 in an appropriate order. Further, each of the sub-frames 1–4 reserves short time duration for audio information as indicated by AU1–AU4. The remaining sub-frames 5–16 are adaptively allocated to one or more video channel data depending upon the above mentioned signals B1–B4 each indicative of the buffer memory occupancy (value) of the corresponding video buffer.

FIG. 6 shows a table previously stored in the look-up table 34. In FIG. 6, notation "/" is added to partition groups of same video channel data numbers merely for purposes of easy reading of the table. The able ie used to rapidly derive one sub-frame allocation data in response to the four control signals B1–B4 applied to the look-up table. AS mentioned above, the sub-frames 1–4 have already been allocated to D1–D4 as illustrated in FIG. 6.

It has been assumed that each of the four control signals B1–B4 exhibits 8 levels (viz., 3 bits necessary). Thus, there exist 4096 ($=2^{12}$) different combinations of B1–B4. In the event that the control signal B1 (for example) takes a higher level, it indicates that the buffer occupancy of the video channel CH1 (viz., the data thereof D1) increases. This means that the bit rate of the channel CH1 should be elevated and thus many sub-frames should be allocated to the CH1.

However, the video channel data allocation to the sub-frames must relatively be determined considering the levels of the other signals B2–B4. That is, in the case where B1=0, B2=0, B3=0 and B4=7 (row number 0008 of look-up table (LUT)), the channel data D4 takes up eleven sub-frames, while the channel data D1 uses only one sub-frames and each of channel data D2, D3 two sub-frames. On the other hand, in the case where each of the control signals B1–B4 indicates the highest level 7 (although rarely occurs) at the row No. 4096, three sub-frames are equally assigned to each of the channel data D1–D4 as shown. Similarly, when each of B1–B4 assumes a lowest level 0 at row No. 0001, three sub-frames are equally assigned to each of the video channels D1–D4. Lastly, if B1–B4 respectively assume levels of 0, 2, 7 and 3 at row No. 0187, the channel data D1–D4 are respectively assigned 1, 3, 8 and 4 considering all the levels of B1–B4.

The output derived from the look-up table 34 is applied to the adaptive bit sharing multiplexer 28 as the sub-frame assignment signal G.

Figure 7:
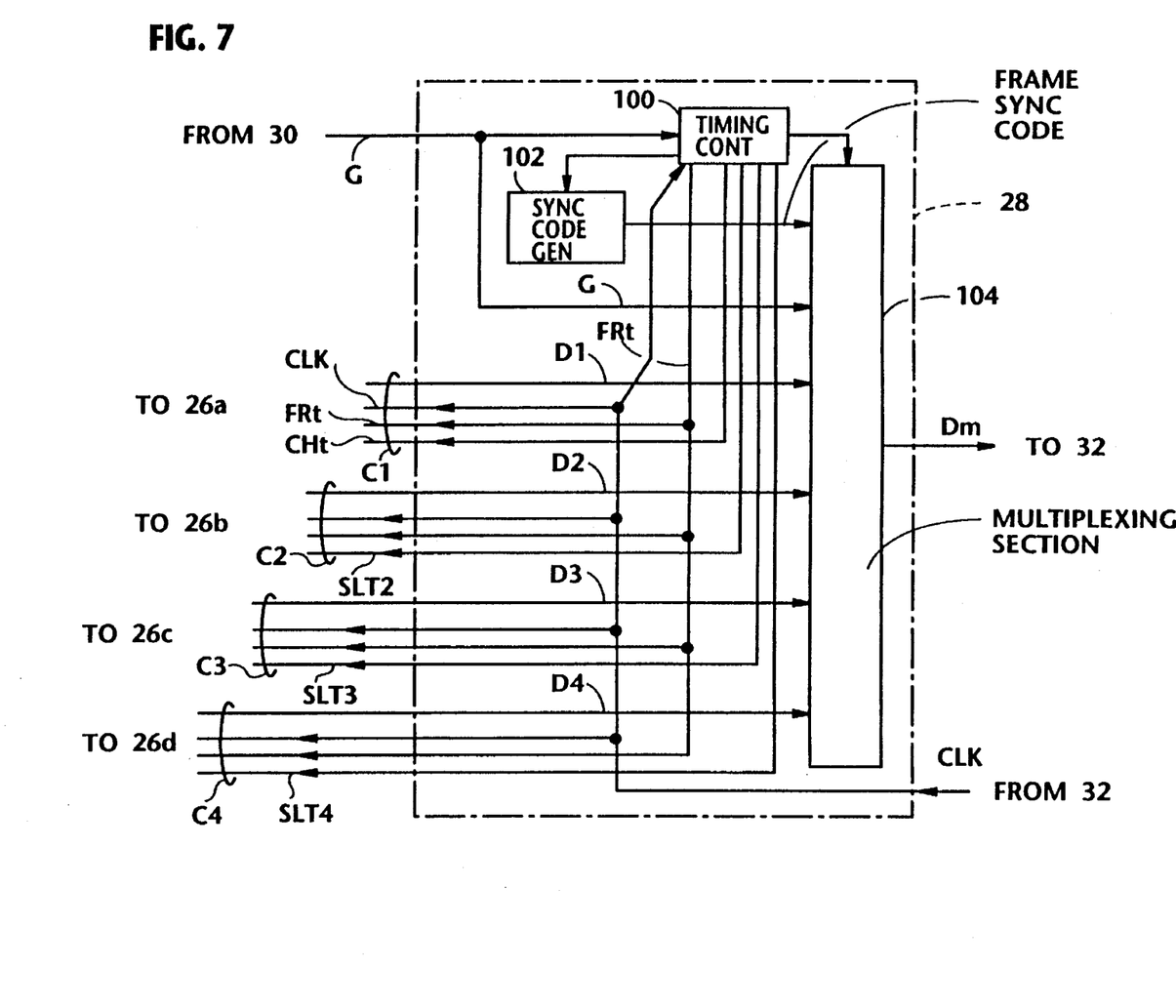
FIG. 7 is a block diagram showing details of the adaptive bit sharing multiplexer illustrated in FIG. 2.

Reference is made to FIG. 7, there is shown a block diagram of the adaptive bit sharing multiplexer 28 which includes a timing controller 100, a sync code generator 102 and a multiplexing section 104. The controller 100 is supplied with the sub-frame assignment code G and also receives a clock CLK from the transmitter 32 (FIG. 2). The timing controller 100 counts pulses of the clock CLK and generates the frame timing signal FRt at the beginning of each frame. The signal FRt is applied to the encoders 26a–26d. Further, the timing controller 100 generates four channel timing signals CHt using the sub-frame assignment code G. The four channel timing signals CHt's are applied to the encoders 26a–26d. The clock CLK is also applied to the encoders 26a–26d. Four groups each of which includes CLK, FRt and CHt, which are directed to the encoders 26a–26d, are respectively denoted by C1–C4 as shown.

The operations of the FIG. 3 arrangement will be discussed with timing chart of FIG. 8.

Figure 8:
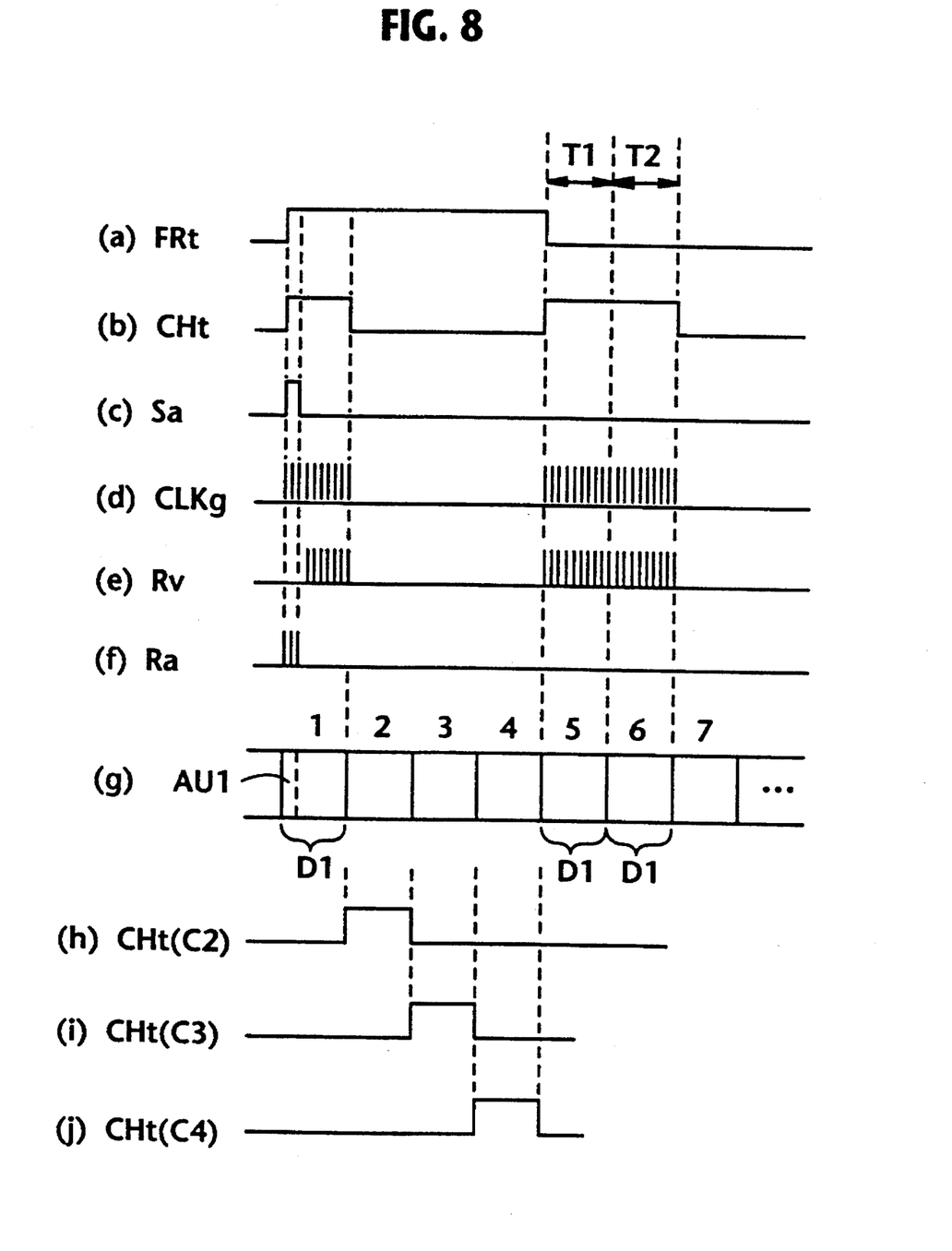
FIG. 8 is a timing chart which shows the timing with which operations are carried out in the encoder of FIG. 3.

A multiplexer controller 62 (FIG. 3) is supplied with the frame and channel timing signals FRt, CHt ((a) and (b) of FIG. 8), and issues an audio timing signal Sa ((c) of FIG. 8) with a predetermined pulse width when receiving simultaneously the two timing signals FRt, CHt. On the other hand, a gate 64 allows the clock CLK to pass therethrough when the channel timing signal CHt assumes a high level. The clock CLK outputted from the gate 64 is denoted by CLKg ((d) of FIG. 8). A clock splitter 66 divides the clock signal CLKg using the audio timing signal Sa. More specifically, the clock splitter 66 issues a clock Ra, which is splitted from the clock signal CLKg, during the time interval for which the audio timing signal Sa assumes a high level. The clock Ra ((f) of FIG. 8) is applied to the audio buffer 58. On the other hand, the clock splitter 66 relays the clock CLKg to the video buffer 51 as a clock Rv when the audio timing signal Sa assumes a low level ((e) of FIG. 8).

The video and audio buffers 51, 58 apply the information stored therein to a multiplexer 68 in synchronism with the timing signals Rv, Ra respectively applied thereto. The multiplexer 68 combines the information from the buffers 51, 58 using the audio timing signal Sa and then generates the channel data D1 therefrom. The sub-frame data including AU1 is combined into the multiplexed data Dm at the multiplexing section 104 at the position of the sub-frame 1 in this case. It is understood that if the channel timing signal CHt assumes a high level during time durations denoted by T1 and T2 (FIG. 8), the multiplexer 68 generates data D1's which will be combined into fifth and sixth sub-frames at the multiplexer section 104. Two delay circuits 70, 72 are provided to adjust operation timing but can be omitted depending on circuit configuration.

For a better understanding of the embodiment, FIG. 8 shows, at portions (h)–(j), three timing charts of the signals CHt's of the groups C2–C4.

Returning to FIG. 7, the multiplexing section 104 is supplied with the four channel data D1–D4 from the encoders 26a–26d. The section 104 combines the frame sync code from the sync code generator 102, the sub-frame assignment code G and the channel data D1–D4 under control of the timing controller 100. Thus, the multiplexed data Dm as shown in FIG. 5 is transmitted via the transmitter 32 (FIG. 2) to the receiver 36 (FIG. 2) over the transmission path 34.

Figure 9:
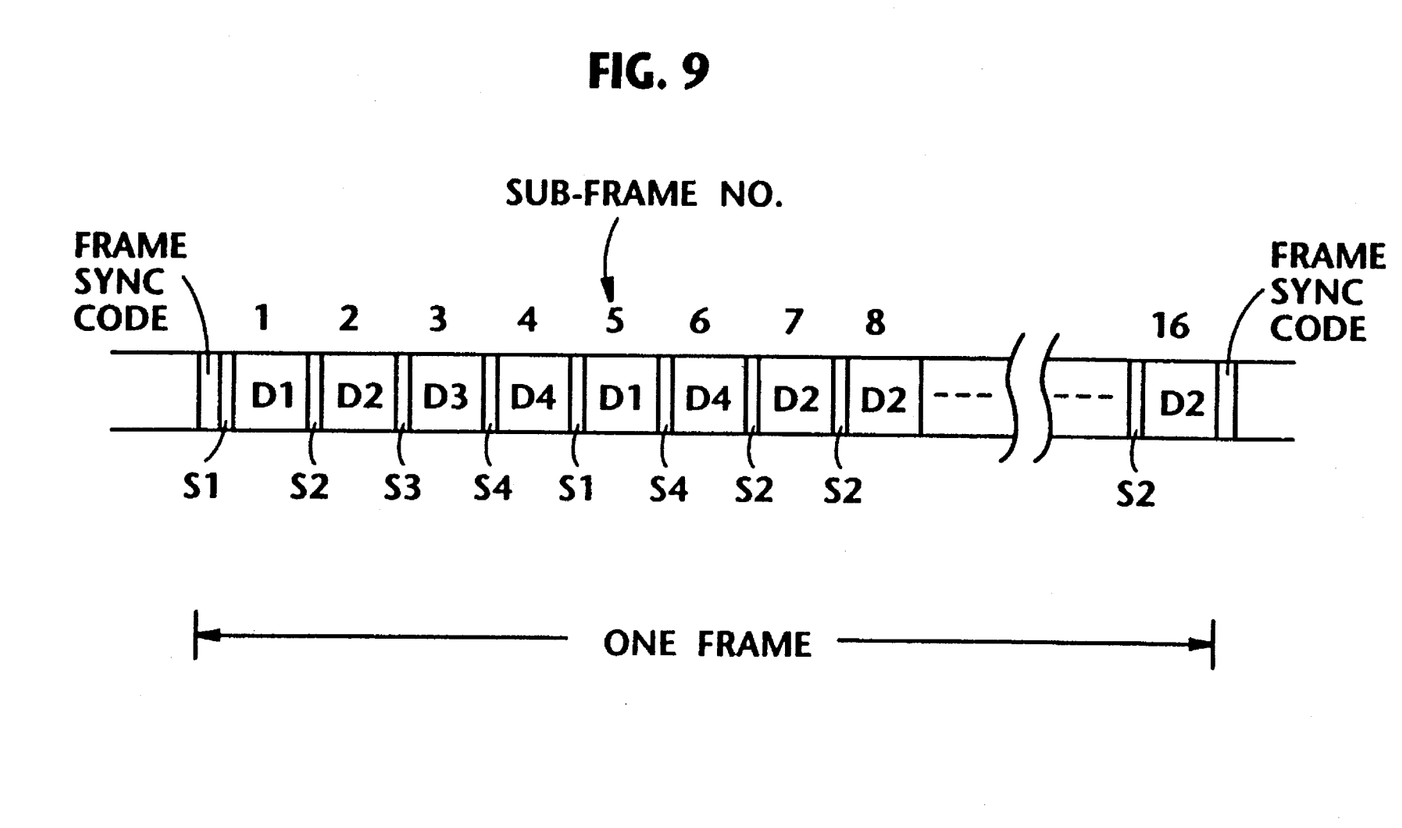
FIG. 9 is a figure which depicts the another frame format of multiplexed data according to the present invention.

FIG. 9 shows another format of the multiplexed data Dm. In this case, four channel data indicating signal S1–S4 are added to the corresponding sub-frames. Thus, the aforesaid sub-frame assignment code G can be omitted.

Since the present invention is concerned with the transmission side, the receiver will not be described in detail for the sake of brevity. It is understood to those skilled in the art to realize the receiver when being informed of the details of the frame format of the data transmitted.

The adaptive sub-frame assignment may be implemented every frame. However, it is within a scope of the present invention to carry out the sub-frame assignment at a predetermined frame interval.

It will be understood that the above disclosure is representative of one possible embodiment of the present invention and its variant and that the concept on which the invention is based is not specifically limited thereto.

What is claimed:

1. An apparatus for transmitting and receiving multiplexed video signals including audio information, comprising a transmission section and a receiving section interconnected with each other via a transmission path, the transmission section comprising a transmitter, a plurality of encoders, an adaptive bit sharing multiplexer, and a sub-frame assignment controller including a look-up table, the receiver section comprising a receiver, an adaptive bit sharing demultiplexer, and a plurality of decoders, the sub-frame assignment controller being responsive to a plurality of control signals to derive a sub-frame allocation datum from the look-up table;

wherein each of said encoders is supplied with a video signal and an audio signal, and each said encoder comprises:

a video encoder for receiving the video signal, subjecting the video signal to inter-frame encoding, and producing encoded video data thereby;

a video buffer for receiving and storing the encoded video data;

a buffer occupancy determiner for determining how much video data is stored in the video buffer, and for producing a buffer occupancy value signal;

an encoder controller that is responsive to the buffer occupancy value signal to control an encoding parameter such that average video data encoded is confined within a predetermined range;

an encoder multiplexer;

an audio encoder for receiving said audio signal and producing encoded audio information;

an audio buffer for receiving and storing the encoded audio information at a fixed rate, and for supplying the encoded audio information to the encoder multiplexer in synchronism with an audio timing signal; and a clock splitter for supplying the audio timing signal to the audio buffer, and for supplying a video timing signal to said video buffer;

and wherein said video buffer supplies said encoded video data to the encoder multiplexer in synchronism with the video timing signal.

2. The apparatus as recited in claim 1, wherein said encoded video data takes the form of variable length encoded sequences, and said buffer occupancy determiner outputs one of said control signals that indicates buffer occupancy of said encoded video information at said video buffer.

3. The apparatus as recited in claim 1, each said encoder further comprising a multiplexer controller supplied with frame and channel timing signals, the multiplexer controller being configured to issue an audio timing signal with a predetermined pulse width upon simultaneously receiving the frame and the channel timing signals, said encoder multiplexer being responsive to said audio timing signal to generate channel data, and said clock splitter being configured to issue a clock signal during a time interval during which said audio timing signal assumes a high level.

4. The apparatus as recited in claim 3, wherein said encoded video data takes the form of variable length encoded sequences, and said buffer occupancy determiner outputs one of said control signals that indicates buffer occupancy of said encoded video information at said video buffer.

5. The apparatus as recited in claim 1, wherein said adaptive bit sharing multiplexer is responsive to a sub-frame assignment signal derived from said sub-frame allocation datum.

6. The apparatus as recited in claim 1, wherein said adaptive bit sharing multiplexer is responsive to a sub-frame assignment signal derived from said sub-frame allocation datum.

7. The apparatus as recited in claim 2, wherein said adaptive bit sharing multiplexer is responsive to a sub-frame assignment signal derived from said sub-frame allocation datum.

8. The apparatus as recited in claim 1, wherein said adaptive bit sharing multiplexer is responsive to a sub-frame assignment signal derived from said sub-frame allocation datum.

9. The apparatus as recited in claim 3, wherein said adaptive bit sharing multiplexer is responsive to a sub-frame assignment signal derived from said sub-frame allocation datum.

10. The apparatus as recited in claim 4, wherein said adaptive bit sharing multiplexer is responsive to a sub-frame assignment signal derived from said sub-frame allocation datum.

\* \* \* \* \*

UNITED STATES PATENT AND TRADEMARK OFFICE
CERTIFICATE OF CORRECTION

PATENT NO. : 5,550,589
DATED : August 27, 1996
INVENTOR(S) : Hirohisa SHIOJIRI, et al.

It is certified that error appears in the above-indentified patent and that said Letters Patent is hereby corrected as shown below:

Column 1, line 56, delete "Mbite/s" and insert -- Mbits/s --.

Column 2, line 11, before "subject" insert -- is --.

Column 2, line 66, delete "ere" and insert -- are --.

Column 4, line 31, delete "ie" and insert -- is --.

Column 5, line 60, delete "34" and insert -- 24 --.

Signed and Sealed this

Third Day of December, 1996

Attest:

BRUCE LEHMAN

*Attesting Officer*    *Commissioner of Patents and Trademarks*